L. BACHAND.
ANIMAL TRAP.
APPLICATION FILED MAR. 24, 1919.
1,359,217.
Patented Nov. 16, 1920.
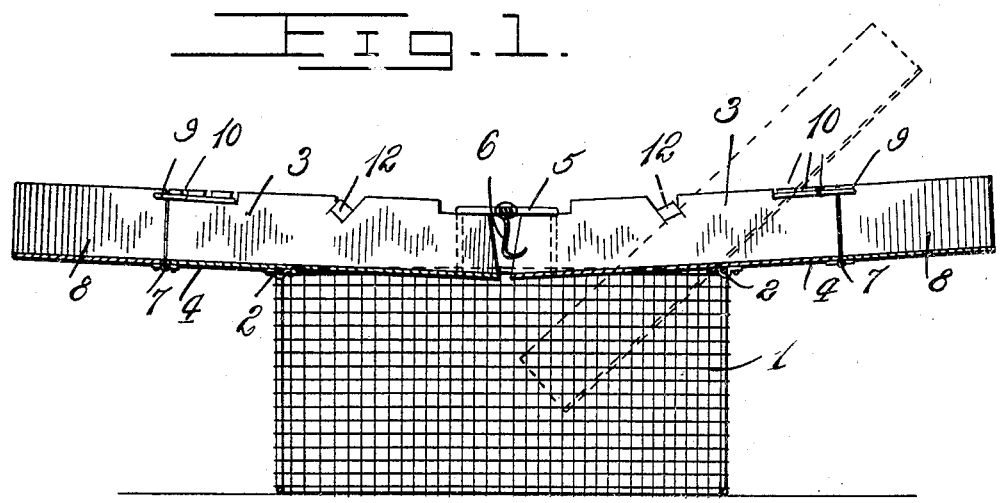
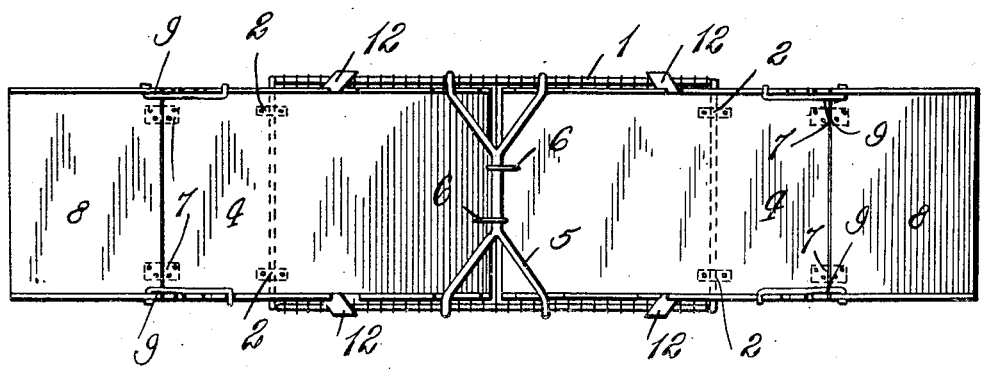
Inventor
Ludger Bachand
By William C. Hinton
Attorney

UNITED STATES PATENT OFFICE.

LUDGER BACHAND, OF MONTREAL, QUEBEC, CANADA.

ANIMAL-TRAP.

1,359,217.  Specification of Letters Patent.  Patented Nov. 16, 1920.

Application filed March 24, 1919. Serial No. 284,774.

*To all whom it may concern:*

Be it known that I, LUDGER BACHAND, a subject of the King of Great Britain, residing at Montreal, Province of Quebec, Canada, have invented certain new and useful Improvements in Animal-Traps; and I do hereby declare that the following is a full, clear, and exact description of the invention, such as will enable others skilled in the art to which it appertains to make and use the same.

The present invention relates to animal traps and more particularly to a rat trap.

An object of the present invention is to provide a strong, durable and simple device of the character aforesaid which could be easily and cheaply manufactured, thereby rendering the same commercially desirable.

With the above and other objects in view which will hereinafter appear as the description continues, the invention consists of the novel features of construction, combination and formation of parts as will be hereinafter more fully described and particularly pointed out in the appended claims.

In the accompanying drawings has been shown a simple and preferred form of the invention, it being, however, understood that no limitation is necessarily made to the precise structural details herein exhibited, but the right is reserved to any changes, alterations or modifications to which recourse may be had that come within the scope of the claims without departing from the spirit of the invention or sacrificing the efficiency of the same.

In the accompanying drawings:

Figure 1 is a side elevation of the trap embodying the present invention; and,

Fig. 2 is a plan view of the same.

Referring now more particularly to the accompanying drawings wherein like and corresponding parts are designated by similar reference characters throughout the several views.

The trap as herein shown consists preferably of a basket 1 which basket is preferably made of wire netting having its upper end opened. Pivotally connected as at 2 to the opposite sides of this basket are the troughs or passageways 3. These members 3 are so balanced that their outer ends 4 are of greater weight than their inner ends, so as to retain the latter at all times in the position as better shown in full lines in Fig. 1.

The handle 5 extends transversely of the basket and the inner ends of the members 3 normally rest against the under sides of the handle 5 so as to keep the sections 3 in this substantially horizontal position. Bait hooks 6 may be suspended from the handle 5. The outer ends 4 of each section 3 have pivotally connected thereto as at 7, the auxiliary section 8 carrying the latch members 9 which are adapted to engage the recesses 10, so that these sections may be adjusted at various angles and make it more enticing for the animal to climb up within the passageways or sections 3. These sections may be adjusted toward the ground upon which the basket 1 is mounted, or it may be so adjusted that a section 8 will extend within a rat hole whereby the animal will be led within the members 3. When the animal travels within the passageways 3 its attention will be attracted by the bait carried by the hook 6 and it will thereby pass toward the center of the basket. As the animal passes toward the inner ends of the members 3 his weight will overbalance the outer ends 4 of these sections and the section upon which he is walking will tilt to the position shown in dotted lines in Fig. 1, whereon the animal will be caused to drop within the basket 1. As soon as the animal is released from the section 3 it will be normally held in horizontal position while the animal will be dropped within the basket 1. The basket as well as the troughs 3 are preferably made of metal, so that the animal when entering the trap will be unable to gain a foothold thereby preventing his escape. The inner ends of each section 3 are provided with the projections 12 which are adapted to engage the sides of the basket 1, so as to limit the downward movement of the inner ends of the sections 3.

Having thus fully described my invention, what I claim as new and desire to secure by Letters Patent is:

1. An animal trap of the character described comprising a wire basket having its upper end open, a pair of trough-shaped members hingedly connected to the opposite ends of said basket and adapted to close the upper end thereof, a handle carried by said basket, and the opposite ends of said trough-shaped members being of greater weight than their inner ends so as to normally hold said trough-shaped members in a horizontal position and adjustable sections hingedly connected to the opposite ends of said trough members substantially as and for the purpose specified.

2. An animal trap of the character described comprising a basket having its upper end open, a pair of trough members hingedly connected to the opposite ends of said basket and adapted to close the upper end thereof, a handle carried by said basket, the inner ends of said trough members adapted to contact said handle, bait hooks mounted on said handle and adjustable sections hingedly connected to the opposite ends of said trough members substantially as and for the purpose specified.

In witness whereof I have hereunto set my hand.

LUDGER BACHAND.